B. F. LARE.
VEHICLE TIRE.
APPLICATION FILED DEC. 12, 1910.
1,015,036. Patented Jan. 16, 1912.
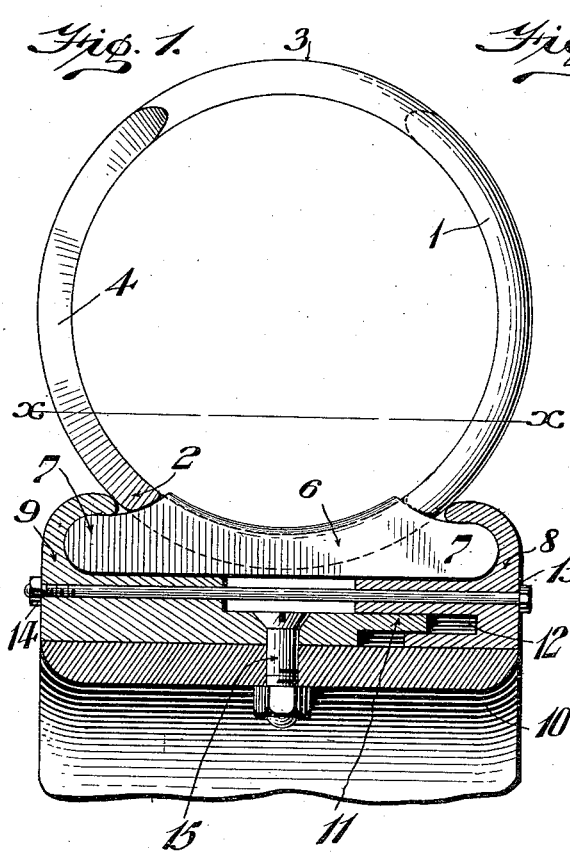
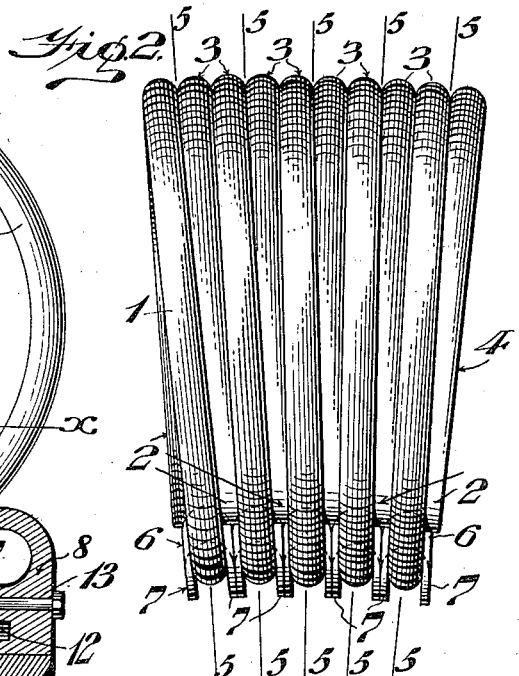
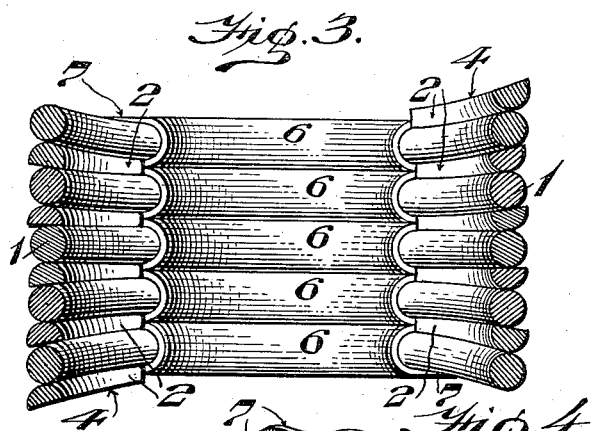
WITNESSES
H. S. Dieterich
L. Douville
INVENTOR
Benjamin F. Lare
By Wiedersheim & Fairbanks
ATTORNEYS
COLUMBIA PLANOGRAPH CO., WASHINGTON, D. C.

UNITED STATES PATENT OFFICE.

BENJAMIN F. LARE, OF PHILADELPHIA, PENNSYLVANIA.

VEHICLE-TIRE.

1,015,036.  Specification of Letters Patent.  Patented Jan. 16, 1912.

Application filed December 12, 1910. Serial No. 596,750.

*To all whom it may concern:*

Be it known that I, BENJAMIN F. LARE, a citizen of the United States, residing in the city and county of Philadelphia, State of Pennsylvania, have invented a new and useful Vehicle-Tire, of which the following is a specification.

This invention relates to a vehicle tire structure and more particularly to a spring tire for automobiles and other vehicles, and has for an object to provide a tire which is not only puncture proof, but which embodies the resiliency necessary to carry out the function of a device of this character.

It has for an object to provide a tire formed of a plurality of convolutions of suitable material to give the desired flexibility and resiliency, with removable means embracing a suitable portion of said convolutions, and clamping means engaging said removable means for holding the tire in position.

It has for a further object to provide a tire formed of a plurality of sections which are so assembled and united as to form a substantially complete continuous circumferential tread surface having in combination therewith, a suitable device for coöperation with the rim of the wheel for fastening the tire to the rim.

It further consists of other novel features of construction, all as will be hereinafter fully set forth.

For the purpose of illustrating my invention, I have shown in the accompanying drawing one form thereof which is at present preferred by me, since the same has been found in practice to give satisfactory and reliable results, although it is to be understood that the various parts of which my invention consists can be variously arranged and organized and that my invention is not limited to the precise arrangement and organization of these parts as herein shown and described.

Figure 1 represents an elevation of one section of a tire embodying my invention showing also in section the tire securing means. Fig. 2 represents a side elevation of a portion of the tire. Fig. 3 represents a section on line $x$—$x$ Fig. 1. Fig. 4 represents a perspective of a novel form of clip forming a part of my tire structure.

Similar numerals of reference indicate corresponding parts in the figures.

Referring to the drawings:—1 designates one section of my novel tire structure, the same comprising, in the present instance, a convolution of a spring or flexible material, the ends 2 of which pass each other at the tread portion 3 and extend downwardly preferably on a curve, having the same radius as the main portion and terminating at a point adjacent the rim engaging means. It will be noted that by this construction a tread surface is formed by two portions of the material, while a rim engaging surface is formed of a single portion of material adjacent to the rim proper. In order to make such a construction practical in a circumferential tire, I have found it is preferable in practice, to taper the respective ends 2, and shown at the part 4, in Fig. 1, and the construction will be more readily understood by referring to Fig. 2 in which the lines 5 designate radial lines of the wheel, with relation to which, the end portions of each convolution are tapered, whereby the planes of the edges of each convolution are oppositely inclined to a radial plane, as will be readily apparent. A further function of the ends 2 is to form stops or limiting means to prevent movement of a section, by engaging with the clip 6 which is preferably formed of suitable material and embraces the single portion or rim engaging portion of a convolution between the said ends 2. This clip 6 comprises a body portion bent substantially U-shaped in order to fit over the spring material, each portion of which has preferably integral therewith, ears 7 which project outwardly from each side of a tire convolution and serve as engaging means with which a suitable clamping member coöperates to secure the clip and tire section to the rim construction. It will be noted that for each section or convolution of the tire there is one of these clips provided, whereby a complete unitary tire structure is formed when secured in place upon a suitable rim.

In the present construction I prefer to secure the tire sections to the rim of the vehicle wheel by means of a plurality of sections 8 and 9, which are adapted to be suitably secured to the felly 10 of the vehicle wheel. These rim sections, in the present instance, consist of annular rings passing circumferentially around the felly 10, one of which is provided with a tongue 11, and the same extend preferably throughout the length of the section 9. This tongue 11 is adapted for sliding engagement with a slot 12 formed in the opposite section 8 which slot also extends preferably throughout the length of the annular section 8, whereby when the two sections are in position upon the felly 10 they have an interfitting connection between them which forms a substantial and strong means of connecting the two against radial movement with respect to the wheel.

13 designates in the present instance, a rod or bolt passing transversely through both sections 8 and 9 and securing the two firmly together by means of a nut and thread connection 14, as will be readily apparent, it of course being understood that there are a plurality of these rods suitably spaced apart about the circumference of the wheel for the purpose intended.

15 designates a stud bolt passing through the felly 10 and also through one of the sections, in the present instance, the section 9, whereby the two sections are securely clamped in position, since a portion of the section 8 is clamped beneath the tongue 11 and thereby held against displacement. It will be understood that there are a number of these studs 15 placed at suitable intervals about the felly to clamp the sections in position.

Having thus described my invention what I claim as new and desire to secure by Letters Patent, is:—

1. In a tire, a plurality of convolutions of suitable material, bifurcated clips engaging said convolutions, an extension on each side of each end of said clips and clamping means adapted to engage said extensions to secure said convolutions to a wheel rim.

2. A spring section for a tire consisting of a coil, having a tread portion and a rim engaging portion, formed of a convolution of spring material, the ends of which extend upon opposite sides of the tread, whereby two portions of the material form the tread of the section, and removable means embracing said rim engaging portion and adapted for engagement by suitable clamping means, said removable means serving as an abutment for said ends.

3. A spring section for a tire consisting of a coil, having a tread portion and a rim engaging portion, formed of a convolution of spring material, the ends of which extend upon opposite sides of the tread, whereby two portions of the material form the tread of the section, and a clip embracing said rim engaging portion and adapted for engagement by suitable clamping means.

4. A spring section for a tire consisting of a coil, having a tread portion and a rim engaging portion, formed of a convolution of spring material, the ends of said convolution extending upon opposite sides of the tread, whereby two portions of the material form the tread of the section, and bifurcated removable means embracing said rim engaging portion and having extensions for engagement by suitable clamping means.

BENJAMIN F. LARE.

Witnesses:
C. D. McVay,
F. A. Newton.

Copies of this patent may be obtained for five cents each, by addressing the "Commissioner of Patents, Washington, D. C."